Patented Jan. 8, 1946

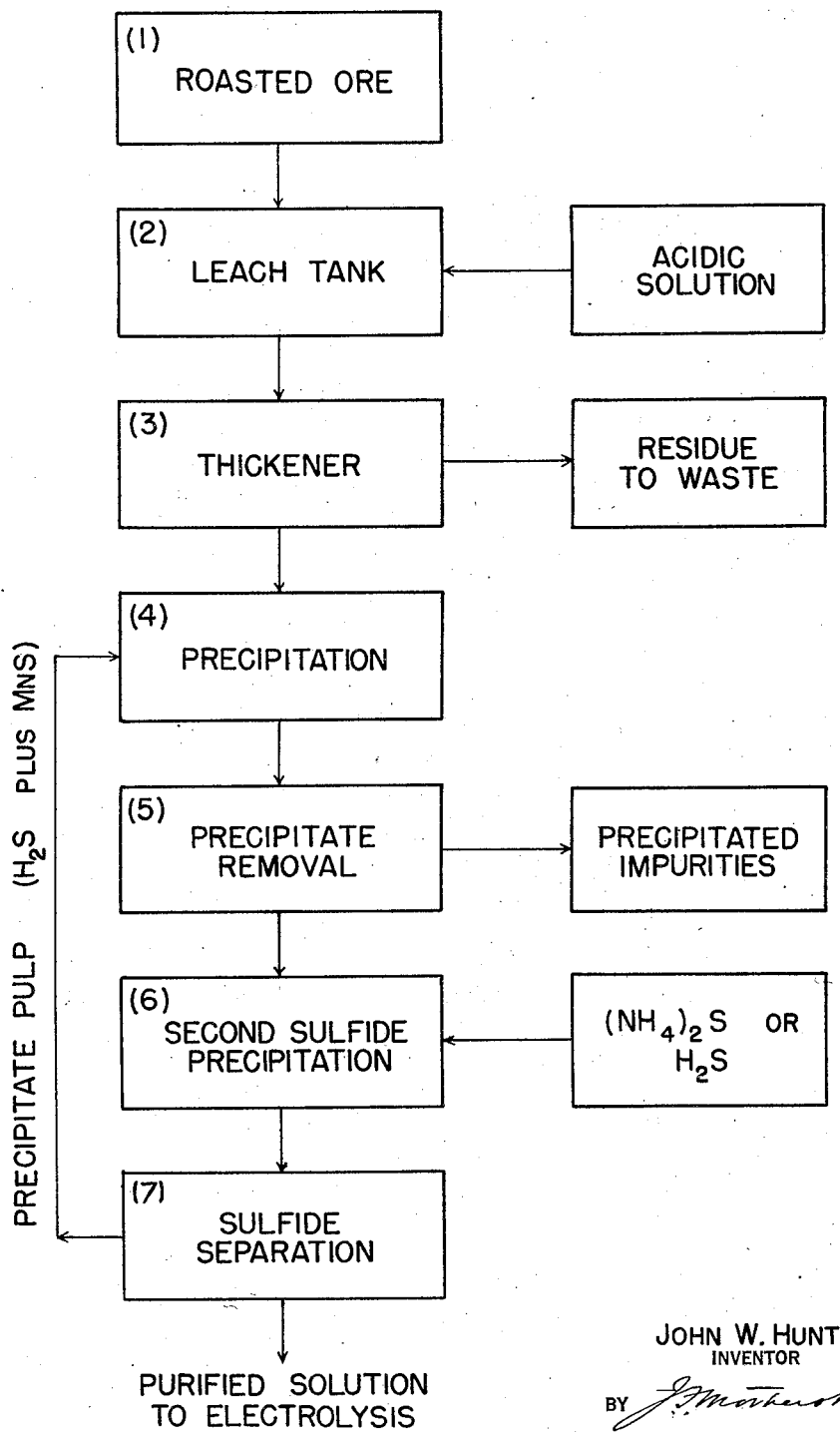

2,392,385

UNITED STATES PATENT OFFICE 2,392,385

PURIFICATION OF MANGANESE ELECTROLYTES

John W. Hunter, Boulder City, Nev.

Application December 1, 1942, Serial No. 467,548

7 Claims. (Cl. 204—105)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to the purification of manganese-bearing solutions. It relates more in particular to a plural stage purification process whereby to secure a marked increase in the degree of purification obtained. By my process of purification, a marked efficiency of purification is secured at lower cost.

The present process is applicable to the sulphide purification of substantially neutral manganese solutions, wherein a soluble sulphide or hydrogen sulphide is utilized as the purification reagent. While my method is primarily directed toward the purification of sulphate electrolytes for the electrodeposition of manganese, it may be used for the purification of other manganese electrolyte solutions, e. g., $MnCl_2$, $Mn(NO_3)_2$ solutions, as part of a cyclic process wherein spent electrolyte is employed to leach a previously prepared manganese source material and the resulting solution returned in its cycle to the cell for electrodeposition of pure manganese metal. My process provides for the purification of substantially neutral electrolytes prepared by using the spent electrolyte from manganese electrodeposition to leach suitably prepared manganese ores, and it may be used with or without other known procedures, as will be explained. Leach solutions may contain as impurities metals such as nickel, cobalt, zinc, lead, arsenic, antimony, iron, copper, cadmium, bismuth, etc. Spent sulphate electrolytes ordinarily also contain considerable ammonium sulphate.

The purification of manganese electrolytes by the precipitation of the impurities therefrom by means of hydrogen sulphide or soluble sulphides is known, and I make no claim to invention of a process in which such added sulphide material comprises a unique reagent for the purification. Rather, my invention involves a procedure and order of steps in which sulphide material is used, in a different way, however, than heretofore used, and also with greatly improved results.

I have found that, in order to obtain the maximum and/or desired amount of purification of the manganese-bearing solutions with sulphides, sufficient time should be allowed for the precipitation to become complete. It is well known that the greater part of all the impurities are precipitated in a very short period of time, but precipitation of the final traces of the impurities frequently is advantageously effected only upon a considerably longer time of contact, and the longer the time allowed, the greater the purity of the finally purified solution. Manganese sulphide held in suspension in impure manganese solutions will act as a precipitant for the impurities mentioned hereinabove, the manganese going into solution, and the impurities precipitating as the sulphides. This fact may be explained in a number of ways, for example, manganous sulphide may react with ammonium sulphate to form manganous sulphate, ammonia, and hydrogen sulphide, thus producing a solution containing hydrogen sulphide, which then functions as a purification reagent. Whatever the mechanism involved, manganese sulphides, freshly precipitated in a second purification step as hereinafter disclosed, act as excellent precipitation reagents in a first purification step. Manganese sulphides derived from other sources can be used but in any case, the manganese goes into solution and impurities are precipitated as the sulphides. If the proportion of manganese sulphide is great, some of it will, of course, come down with the precipitate.

According to my invention, I subject impure manganese electrolyte solutions to a plurality of sulphide purification steps. The impure solution, from the neutralization leach tank and filter or thickener, is subjected to a sulphide precipitation, while maintained at a suitable pH, in which the precipitation reagents consist of the precipitated manganese sulphides from a later purification step, optionally with any desirable quantity of additional sulphide materials known to be purification reagents for the solution, such as hydrogen sulphide, ammonium sulphide, barium sulphide or sodium sulphide. The precipitation is made in suitable apparatus, e. g., agitators, gas dispersion apparatus, adsorption towers (where $H_2S$ is used) etc. Sufficient total precipitating sulphide is supplied in this step, preferably to preponderantly precipitate all impurities. The solids and solutions are separated thereafter by suitable means—thickeners ordinarily are used, but filters, classifiers, or their equivalents can be substituted, singly or in desirable combination. The solids are utilized in any desirable way, e. g., for the recovery of values therefrom.

The clarified solution from the previous step, then, is subjected to sufficient sulphide purification reagent to precipitate the remaining impurities and a quantity of manganese sulphides. The solution is maintained during this precipitation at a suitable pH, ordinarily between 6.5 and 7.0, but limited between about 4.0 on the lower, and the point where manganese hydrates precipitate in quantity on the upper part of the scale. This range also applies to the precipitation in the first purification. Known sulphidizing reagents, as mentioned above, are utilized in this second sulphide precipitation step but preferably ammonium sulphide or hydrogen sulphide is used in this step. The precipitated solids are removed by known means from the solution, the solution thereafter being further purified and/or processed for the electrodeposition of the manganese therefrom in accordance with known procedures. The solids (generally as a sludge) are utilized as purification reagents in the first purification step, as disclosed above.

It is immaterial to my invention as to the number of separate steps in the entire purification procedure. My invention involves a new multi-stage purification, wherein the precipitated product from the later stages of the process is used to largely purify the solution in the initial stages. Ordinarily, although not necessarily, I allow more time for contact between the precipitated solids and the solution in the second than in the first purification step, in order to secure the maximum purification. Also, in the second purification step, a relatively large amount of reagent can be used, without loss of the material for later purification. This allows a maximum of sulphide to be used in the process with a minimum loss of manganese.

Obviously, no more manganese sulphides will be precipitated in the purification scheme, in ordinary practice, than can be used to react with the impurities in the initial sulphide purification. Added advantages accrue from the precipitation of this manganese sulphide in the final step: (1) The floc or precipitate removes traces or amounts of impurities, by adsorption or other means, thus materially improving the solution's purity; (2) the floc provides volume to and aids in the separation of the impurities by settling or filtration; (3) it maintains a suitable sulphide ion concentration for final purification of traces of the impurities; (4) it gives added time, in the absence of reversible sulphide reactions for final purification of the solution, which is absent in previous purification schemes; (5) it lowers losses of manganese occurring in the one-stage purification as the sulphides, because this metal re-enters solution in the initial stage; and (6) it forces the less soluble sulphides more completely from solution (primarily oversulphidization). Other detailed advantages have also been noted but need not be pointed out fully as they will become apparent when the method is practiced.

My process may be a step in a more detailed purification process. For example, I may neutralize the spent electrolyte with calcine, remove the iron from the solution by oxidation and pH control, next employ my plural stage sulphidization purification, and finally further treat the solution, e. g., by xanthates or activated charcoal, etc.; and subsequently precipitate metallic manganese from the purified solution. The overall procedure may be varied widely, but in any case the inclusion of the multi-stage sulphide purification procedure of my invention, whenever sulphide purification is indicated, is definitely advantageous.

One manner of carrying out the invention is indicated by the flow sheet comprising the drawing, the numbers 1 to 7 indicating the principal steps in a purification procedure when employing the invention. The ore shown at 1 is suitably prepared, for example, by subjecting it to a partial reducing roast to produce a manganese product comprising $Mn_nO_m$ wherein the relation of $m$ to $n$ is less than 2 and predominantly has the relationship of one. The reduced ore in a crushed or ground condition is introduced into a leach tank at 2 and treated with an acid solution, specifically, the spent electrolyte having a pH of the order of 3 to 5, or even a still lower pH depending upon the specific electrolytic procedure employed. The solution becomes more basic as the manganese is taken into solution and is controlled preferably to be between 6 and 7. If the manganese taken into solution in the leaching operation is relatively great, the pH will be raised to a point at which some impurities such as iron and the like will precipitate out as the hydrate. The residue, plus any precipitated impurities such as iron, is separated from the solution, and the solution is then ready for further purification. Further pH control or further separation of iron and other impurities (some of which may be separated solely by pH control) may be advisable before the first sulphide precipitation step practiced in accordance with my invention. While my invention is not primarily concerned with preliminary purification procedures, obviously, such procedure may be used as conditions indicate.

The leach solution, with or without previous purification treatment, is delivered to a suitable tank at 4 with a pH preferably of the order of 6 to 7. At this point hydrogen sulphide is introduced by bubbling beneath the surface and a pulp comprising essentially manganese sulphide produced at stage 7 is also introduced. The solution is agitated and then allowed to stand for several hours after which the precipitate formed is separated and delivered to a suitable point in the plant for further use to extract the values therefrom, or discarded, depending upon the economies involved. The solution so purified is then subjected to a second sulphide precipitation step by the introduction therein of ammonium sulphide. The solution to which the ammonium sulphide has been added is agitated and then allowed to stand for several hours. A precipitate or floc settles out in the form of a pulp. This pulp comprises principally manganese sulphide but also contains some remaining impurities which were not removed from the solution in the first precipitation step indicated at 4 in the drawing. The solution is then delivered for further purification, if desired, or may go directly to the electrolytic cells.

The process indicated on the flow sheet, as described above, is illustrative. I have carried out this illustrative process with very good results as shown by the following examples:

*Example 1*

480 liters of leach solution, having a pH of 7.01, and relatively free of impurities, the precipitation of which was brought about by suitable pH control, were treated by the addition thereto of 19 liters of a soft sludge separated from the solution in the second purification step of a previous batch carried out in accordance with my invention and comprising essentially a slurry or sludge of manganese sulphide. With this sludge was also introduced 0.3 g./l. of hydrogen sulphide. The solution, with the added sludge, was agitated for 90 minutes and allowed to stand for 8 hours. A resulting precipitate was separated from the supernatant solution, and to the solution so obtained was then added 0.2 g./l. of ammonium sulphide. The solution was then agitated for 45 minutes and then allowed to stand for 12 hours. The precipitate, comprising a sludge of manganese sulphide, plus some impurities, was removed and employed for further treatment of the leach solution of a subsequent batch in accordance with the first step of the process. 430 liters of finally purified manganese solution were obtained having a pH of 7.29. This solution was employed as a feed to an electrolytic cell and the cell operated for the electrodeposition of the manganese content therein. The impurities in the initial solution and the final purified solution were determined by analysis, the relative values being shown by the following table:

|  | Untreated solution | Treated solution |
| --- | --- | --- |
| g./l. Mn | 32.4 | 30.9 |
| g./l. Cu | 0.15 | 0.00005 |
| g./l. Fe | 0.0001 | 0.00016 |
| g./l. Pb | 0.003 | Below 0.001 |
| g./l. As | 0.00068 | Below 0.00005 |
| g./l. Ni | 0.0014 | Below 0.0001 |
| g./l. Co | Below 0.00005 | Below 0.00005 |
| g./l. (NH$_4$)$_2$SO$_4$ | 140.0 | 137.4 |

The headings "Untreated solution" and "Treated solution" are meant to identify, respectively, the solution before treatment in accordance with the present invention and after such treatment.

*Example 2*

479 liters of raw solution were treated in the same manner as described in connection with Example 1 with, however, the following noted differences: The pH of the initial solution was 6.5 and the concentration of manganese and ammonium sulphate in solution was somewhat lower than in the previous example. The "untreated" solution was also somewhat purer than the "untreated" solution employed in Example 1. The relative values of the impurities before and after purification were of the order of those found in Example 1. The purified solution obtained in accordance with the present example was introduced into an electrolytic cell and a good plate of manganese produced.

I wish to point out that the relative amounts of impurities removed, in the second step of the purification procedure, are small and that even though the sludge employed in the first step contains these impurities in addition to the manganese sulphide content thereof, the effectiveness of this sludge, in the first treatment step, is not appreciably impaired over the results obtained if a relatively highly pure manganese sulphide is employed in place of the sludge. The introduction of the sludge back into the solution has an advantage in that there is no loss of manganese, such as would otherwise occur, and no purification of this sludge is necessary with the attendant costs that would otherwise be involved. The agitation and settling time are not fixed. It is recommended that the solution be agitated in the first step of the process for one to three hours and then be allowed to stand for 6 to 10 hours, depending upon the amount of impurities in the solution and the character of the precipitate. This settling time also may be modified depending upon the type of equipment employed to separate the precipitate. The agitation time in the second purification step, in accordance with my invention, may be cut down to approximately ¾ of an hour, although, in general, the settling time may be increased, even to as long as 16 hours or more, depending upon conditions encountered.

I refer hereinabove to the use of a soluble sulphide and have employed the term "soluble sulphide" in the claims. I wish to include in this term hydrogen sulphide which, while a gas, may be introduced into solution, and other sulphides which, under the conditions of the solution, are readily soluble. Preferably, the sulphide employed is one which will not introduce into the solution an ion the presence of which may have a deleterious effect upon plating. The term substantially neutral solution is intended to mean a solution which has already been substantially neutralized with manganese oxide, and my process is to be distinguished from one wherein a product comprising manganese sulphide, such as a manganese matte, is treated to recover its manganese value under conditions such that some purification also takes place. In general, the concentration of manganese ions in the solution will be decreased, or at least will not be increased when practicing my invention, while in the procedure with which my invention is herein compared, the concentration of manganese ions in solution will be increased. In this process also the pH of the starting solution (spent electrolyte) will be relatively low, as a general rule. In general the pH of the solution purified in accordance with my invention will be between about 6.5 and 7, although some latitude is permitted in pH control, depending upon the electrolytic procedure followed.

I have described my invention in detail so that those skilled in the art will understand the manner of practicing the same but the scope of my invention is defined by the claims.

What I claim as new and desire to protect by Letters Patent is:

1. The process of purifying substantially neutral manganese electrolyte solutions containing manganese and ammonium sulphates, which includes the steps of adding to the solution a freshly-prepared precipitate comprising manganese sulphide, agitating the solution, separating the resulting precipitated impurities, treating the solution so obtained with a soluble sulphide whereby to precipitate as the sulphide a portion of the manganese in the solution, and separating the resulting precipitate, the precipitate obtained from the last mentioned step being employed in the first mentioned purification step.

2. The method of purifying a manganese electrolyte solution which includes first treating the said solution with a pulp precipitate comprising manganese sulphide, separating the solution from the solids, thereafter treating the said solution with enough soluble sulphide to precipitate at least some of the manganese as the sulphide and remove remaining impurities, and removing the precipitate so formed, the said precipitate being employed in the first mentioned step.

3. The method of purifying a substantially neutral manganese salt solution which includes first treating the solution with freshly-prepared manganese sulphide, removing the resulting precipitate, and thereafter treating the resulting solution with enough soluble sulphide to precipitate at least some of the manganese and remove remaining impurities, the manganese sulphide from the final recited step being employed in the first mentioned step.

4. The method of purifying a substantially neutral manganese sulphate solution which comprises introducing therein a relatively small proportion of manganese sulphide and an additional soluble sulphide, removing the resulting precipitate and then adding to the resulting solution enough soluble sulphide to precipitate remaining impurities and some of the contained manganese.

5. The cyclic method of producing electrolytic manganese which comprises leaching a partially reduced manganese ore with spent electrolyte to a pH of between about 6.5 and 7, whereby to form a substantially neutral manganese electrolyte solution, agitating said neutral solution with a pulp including manganese sulfide precipitated from a similar solution during a later step in the process, separating the solution, treating the said solution with enough soluble sulphide to precipitate as the sulphide at least a portion of the contained manganese, the resulting precipitate being used in the herein described first purification step, separating the solution, and plating manganese therefrom, whereby to produce spent electrolyte for use in the first described step herein.

6. A method of producing a purified manganese solution for electrolysis which comprises treating an approximately neutral solution of manganese ore-leach solution with freshly-precipitated manganese sulfide in an amount sufficient to react with the impurities in said leach solution, separating and discarding the precipitated impurities, adding ammonium sulfide to the partially-purified supernatant solution to precipitate the remaining impurities together with fresh manganese sulfide, separating and recovering a purified manganese solution suitable for electrolysis, and returning said fresh manganese sulfide to treatment of crude manganese ore-leach solution as before.

7. A method of producing a purified manganese solution for electrolysis which comprises treating about 480 liters of crude manganese solution from acid-leached ores thereof, said solution having a pH of 7.01, with about 19 liters of freshly-precipitated manganese sulfide sludge containing 0.3 gram per liter of hydrogen sulfide, agitating the resulting mixture for about 90 minutes, allowing said mixture to stand for about 8 hours, separating and discarding the precipitated impurities, adding about 0.2 gram per liter of ammonium sulfide to the supernatant solution to precipitate a fresh batch of manganese sulfide sludge, separating and recovering a purified manganese solution, and returning said fresh manganese sulfide sludge to treatment of crude manganese solution as before.

JOHN W. HUNTER.